E. H. FARQUHAR.
METHOD OF MANUFACTURING TURBINE BUCKETS.
APPLICATION FILED JAN. 2, 1906.
901,960.
Patented Oct. 27, 1908.
2 SHEETS—SHEET 1.
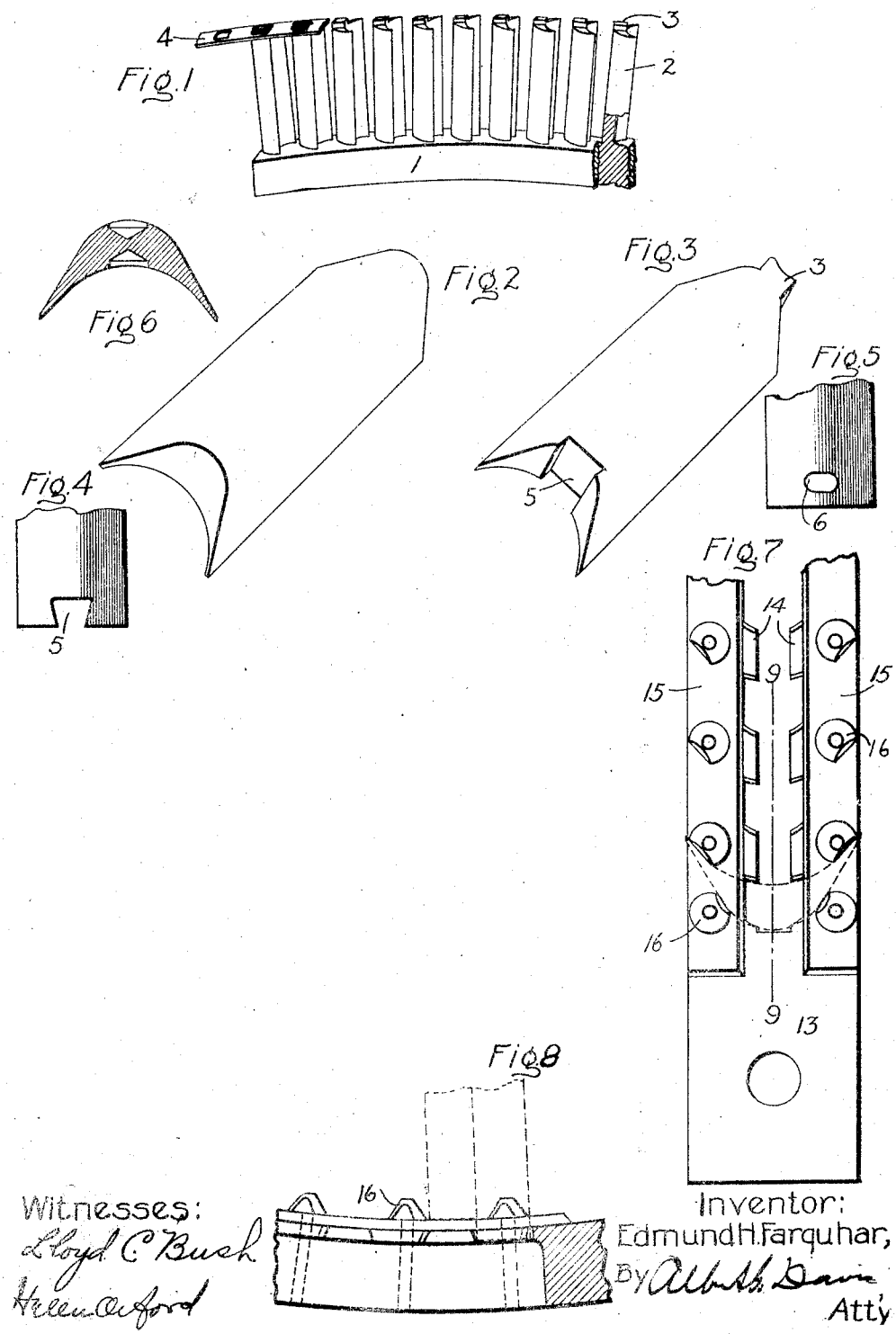
Witnesses:
Lloyd C. Bush
Helen Oxford
Inventor:
Edmund H. Farquhar,
By Albert H. Davis
Att'y

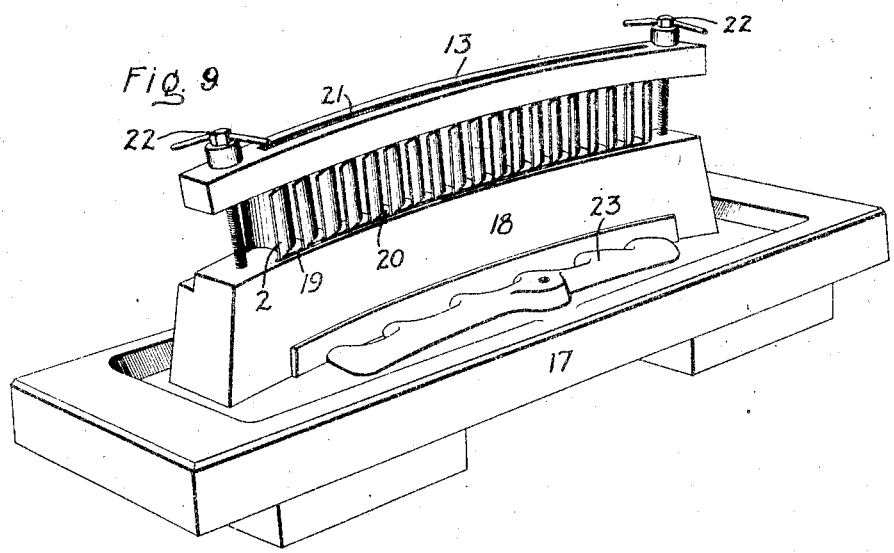
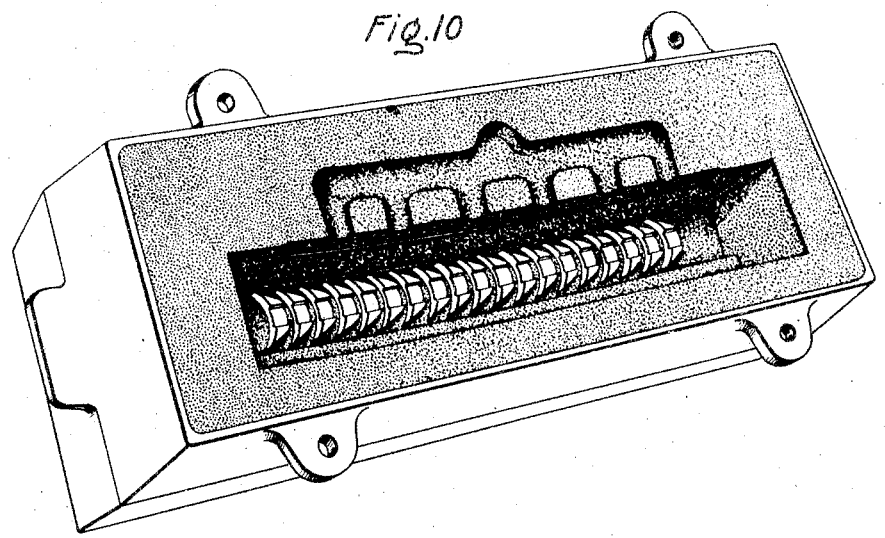
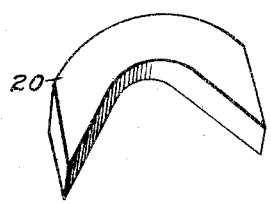

UNITED STATES PATENT OFFICE.

EDMUND H. FARQUHAR, OF SCHENECTADY, NEW YORK, ASSIGNOR TO GENERAL ELECTRIC COMPANY, A CORPORATION OF NEW YORK.

METHOD OF MANUFACTURING TURBINE-BUCKETS.

No. 901,960.   Specification of Letters Patent.   Patented Oct. 27, 1908.

Application filed January 2, 1906. Serial No. 294,182.

*To all whom it may concern:*

Be it known that I, EDMUND H. FARQUHAR, a citizen of the United States, residing at Schenectady, county of Schenectady, State of New York, have invented certain new and useful Improvements in Methods of Manufacturing Turbine-Buckets, of which the following is a specification.

The object of the present invention is to improve the process of manufacturing turbine buckets by casting separately formed buckets into a base whereby uniform and satisfactory results may be obtained by the class of workmen ordinarily employed in foundries and machine shops.

In the manufacture of buckets for elastic-fluid turbines, it is of the utmost importance that the individual buckets shall be firmly secured to their support on account of the great stress to which they are subjected, that the buckets shall be accurately alined top and bottom, that the inlet and discharge angles shall be in exact accordance with the theoretical angles therefor, and that the height, pitch and location of the bucket with respect to the base shall be in exact accordance with the specifications and drawings therefor.

In carrying out my invention I make the buckets out of a suitable alloy that is capable of being readily worked, is capable of receiving a smooth finish on its faces, is sufficiently hard to prevent the steam or other motive fluid from cutting it excessively, is non-corrosive, and one that will not rust or otherwise be injured by the motive-fluid. Experience has demonstrated that buckets made out of a hot rolling alloy are satisfactory for the purpose. I prefer to make the base with which the buckets are united out of an alloy which possesses the necessary strength, is easy to work, will make a good union with the buckets, and requires a relatively moderate temperature in casting. Where the base is made of an alloy having the same or substantially the same characteristics as the buckets, it will generally be satisfactory.

I find it desirable to pass the bucket stock through swaging dies after it is received from the extruding dies or other means for forming it in order that the dimensions may be more nearly correct. This also has the advantage of giving a somewhat better surface to the buckets. Where the bucket stock is sufficiently close to dimensions for practical purposes the swaging may be omitted.

The buckets as now formed by the extruding dies have the proper shape in cross-section except that they are not sharp enough at the inlet and discharge edges, and are not of the right width. I therefore take each bucket, cut it to the proper length and dress the edges until the bucket has the proper width, and sharpen the edges. The dressing and sharpening are preferably done by a single operation, as by the use of a milling machine having two rotary cutters acting simultaneously on opposite sides of the bucket. When the buckets are to be provided with a cover the ends adapted to receive it are formed by milling or otherwise with suitable tenons, either round, square or substantially so, or of other suitable shape.

The preferred method of procedure in a foundry is to pour the metal at a uniform or substantially uniform temperature, and where structures are being made with buckets differing considerably in their cross-sectional area, it follows that unless special means are provided, some of the buckets of large cross-section may not be thoroughly united to the cast-metal base owing to chilling, while others with smaller cross-section may be overheated to such an extent as will render them worthless; and in this connection it must be borne in mind that if one bucket is not properly united or is in any way injured it will result in discarding the whole bucket segment. To prevent the above objections and to permit of the foundry using metal at a uniform or substantially uniform temperature for all buckets without regard to their cross-section, I form the base ends of all of the buckets so that they will present the same or substantially the same cross-section to the molten-metal. This can be done by decreasing the amount of metal in the base ends of the buckets, as by slotting. The buckets need not in all cases be so treated; this being governed largely by the size of the buckets and the temperature of the metal used. The slot is of suitable size and shape to meet the requirements. In some cases I find it advantageous to make the slot substantially rectangular with parallel walls and in other cases with side walls forming a dove-tail groove or opening so that there is a mechanical securing of the parts in addition to that due to the fusing or uniting of the metals forming the buckets and base. By increasing the size of the slot in large buckets and decreasing it in the small, uniform results can be obtained without changing the temperature of the molten-metal and without danger of defective structures. The next step is to prepare the mold. Mounted on the follow board is a block of suitable shape to form a chamber in the mold to receive and position a core which is inserted at a later stage of the process after the block has been removed. In the top of the block which is preferably of metal, is a shallow groove arranged to receive the base ends of the individual buckets. Between the buckets and engaging the base and side walls of the groove and also the buckets, are space blocks which determine the proper pitch of the buckets. In addition to this they determine the proper inlet and discharge angles of the buckets. A crown is then applied to the upper ends of the buckets, the said crown being provided with notches, grooves, or other equivalent devices registering with the tenons, and preferably, but not necessarily, with guiding pins or equivalent devices serving to direct the tenons into their proper places. These pins are desirable because they save time in mounting the crown in place. The buckets may then be alined with a gage to insure their occupying the proper position. In the present case they stand radially. The crown is then clamped in place. The block and crown constitute in effect a frame for holding the buckets, and it is evident that the construction can be varied without departing from the invention. Preferably, but not necessarily, the block is provided with a gate or runner. Molding sand is then packed around the block and between the buckets. The drag or nowel is then mounted on the followboard and a certain amount of sand added and rammed. At or about this stage the crown is removed and the drag or nowel completely filled with sand and rammed. After it is suitably surfaced on the top a cover is clamped thereto and the mold reversed. The follow board is then removed exposing what was the under side of the block, and the sand covered with charcoal or other parting medium. The cope is then placed in position with means for forming the sprue and one or more risers where such devices are necessary. The cope is then filled with sand and rammed and the sprue and risers removed. The cope is then removed exposing the block and the gate or runner. These are removed and then the spacers between the buckets. This leaves the ends of the buckets projecting a certain predetermined distance through the sand. The mold is then slicked if necessary and otherwise treated to keep it in shape. After the mold is completed it is put in an oven and baked for a predetermined length of time at a given temperature. This dries out a certain amount of moisture and makes the mold hard enough to insure a good casting without cutting. The next step is to insert the core and replace the cope, when the mold is ready for service. Metal at the proper temperature is poured into the mold, which fuses with the buckets and the whole becomes an integral mass, after which it is allowed to cool. On removing the casting and the attached buckets, the gate and sprue are cut off in the ordinary manner and the casting dressed to the proper dimensions and provided with one or more holes for bolts where needed to secure it to a wheel or other support.

If desired the bucket segment may be tested before finishing by striking each of the buckets a light blow to ascertain whether or not the buckets are properly united with the base. Such action will cause the buckets having defective union with the base to give off a different note from those having a perfect union. If the casting is a little rough at the roots of the buckets it may be smoothed by a suitable tool.

The final step is to place the cover over the ends of the buckets and rivet over the ends of the tenons.

In the accompanying drawings which illustrate one means by which my invention can be practiced; Figure 1 is a perspective view of a bucket segment with part of the cover removed therefrom; Fig. 2 is a perspective view of a section of the bucket stock as received from the extruding dies; Fig. 3 is a perspective view of a bucket ready to be inserted in the mold; Fig. 4 is a detail view showing a dovetail slot in the base end; Figs. 5 and 6 are detail views of further modifications in this particular; Fig. 7 is an inverted plan view of the crown used to hold the outer ends of the buckets while in the mold; Fig. 8 is a section taken on line 9 9 of Fig. 7; Fig. 9 is a perspective view of the follow-board with the arch-shaped block mounted thereon; Fig. 10 is a perspective view of the drag or nowel after it has been inverted and the follow board and block have been removed; and Fig. 11 is a perspective of one of the spacing devices.

In Fig. 1, 1 represents the cast-metal base and 2 the separately formed buckets cast into the base and forming an integral part thereof. In Fig. 2 is shown the bucket as received from the dies and before it is dressed or cut to the required length.

In Fig. 3 are shown the buckets after they are dressed and ready for use. On the outer end of the bucket is a tenon 3 for securing the cover 4. The base of each bucket is reduced in cross-section by cutting a slot 5, Figs. 3 and 4, or making a hole 6, Fig. 5. The slot may have straight sides as in Fig. 3 or dovetailed as in Fig. 4, or two oppositely disposed holes may be provided as in Fig. 6.

In Fig. 7 is shown in inverted plan the crown 13 for holding the upper ends of the buckets. Projections 14 are formed on adjacent surfaces of the longitudinal members 15, and between said projections are slots or grooves to receive the tenons and hold the buckets. Each longitudinal member is provided with a row of tapered pins 16 which, when the crown is lowered into place, engage the ends of the buckets and direct the tenons into the spaces between the projections.

In Fig. 9, 17 represents the follow-board, and 18 the block containing a shallow groove 19 on its upper face to receive the buckets 2 and the removable spacers 20. The crown 13 is provided with a longitudinal slot 21 through which the tenons on the buckets can be seen. The crown is held in place by clamps 22 that enter the block 18.

23 represents the gate or runner which may be attached to the block or be separable therefrom.

In Fig. 10 is shown the drag with the cope removed and the base ends of the buckets extending through the sand. In the illustration the block and crown are segments of circles of different diameters, but they can be made straight and bent afterwards, if desired, although this is not so satisfactory as it requires an additional operation.

I have described the various steps in the process in the order which I have found to be most satisfactory, but it is evident that the order of the steps can be changed somewhat and also that some of those of minor importance can be omitted where the requirements as to the final product are not so severe as those mentioned.

The means or apparatus for casting the buckets into the base is not claimed herein because it forms the subject-matter of my divisional application Serial No. 356,763, filed Feb. 11, 1907, in compliance with the requirement for division made by the U. S. Patent Office under the provisions of Rules 41 and 42 of Office practice.

What I claim as new and desire to secure by Letters Patent of the United States, is,

1. The method of manufacturing bucket segments which consists in forming the buckets to the desired dimensions, mounting the buckets at one end in a holder to space them apart and preserve their alinement, mounting a second holder adjacent the other ends of the buckets to space and aline them, securing the buckets by suitable means against longitudinal movement in the holders, placing the buckets so prepared and arranged in a nowel and packing molding sand round one of the holders and between the buckets to support and position them therein, releasing the securing means to permit a holder to be removed from the ends of the buckets, completing the nowel, reversing it, forming the cope, separating the flask, removing the last-mentioned holder to expose the ends of the buckets and to form a space in the mold to receive the molten metal which forms the supporting member of the series of buckets composing the segment, the ends of the buckets projecting from the sand into said space, closing the mold and pouring molten metal into said space round the ends of the buckets, the temperature of the metal being such as to cause a fusion between it and the ends of the buckets.

2. The method of manufacturing bucket segments which consists in cutting the buckets to the desired length, forming a tenon on one end, sharpening the edges, mounting the other ends of the buckets in a device to space them apart and aline them, mounting a second spacing device on the tenons, clamping the buckets between the two devices, ramming molding sand around said devices and between the buckets, removing the first device to expose the ends of the buckets, and pouring molten metal into the mold around said ends, the temperature of the metal being sufficiently great to cause fusion with the buckets.

3. The method of manufacturing bucket segments which consists in forming the buckets to the desired dimensions, mounting both ends of the same in holders to space them and preserve their alinement, securing said holders against movement longitudinally of the buckets, ramming molding sand around the buckets, removing the holders leaving the ends of the buckets exposed, baking the mold to harden it, and pouring molten metal around the exposed ends of the buckets.

4. The method of manufacturing bucket segments which consists in forming the buckets to the required dimensions, reducing the cross-sectional area of the ends of the buckets to be exposed to the molten metal, mounting one end of the buckets in a holder to space them apart and preserve their alinement, mounting a second holder on the other ends of the buckets to space and aline them, clamping the buckets between the two holders, packing molding sand around the first holder and between the buckets, removing the holders, completing the mold, and pouring molten metal around the exposed ends of the buckets, the temperature of the metal being such as to cause a fusion between it and the buckets without injuring the sharpened edges of the buckets.

5. The method of manufacturing bucket segments which consists in forming the buckets to the required dimensions, mounting the buckets in a grooved block, inserting spacers between the base ends of the buckets, mounting a crown on the opposite ends of the buckets to preserve the alinement of the buckets at that point, packing sand around the buckets and block, removing the crown and filling the mold to cover the exposed ends of the buckets, reversing the mold, forming the cope, separating the parts of the flask, removing the block and the individual spacers, inserting the core and closing the flask and pouring molten metal into the mold of such temperature that it will cause a fusion with the bucket bases without injuring the sharpened edges.

6. The method of manufacturing bucket segments which consists in forming the buckets to the required dimensions, mounting one end of the buckets in a spacing device, securing the buckets at their other ends by suitable means against longitudinal movement, packing sand around the buckets and said device, removing the securing means and filling the mold, reversing the mold, forming the cope, separating the parts of the flask, removing the spacing device, inserting the core, closing the flask, and pouring molten metal at a suitable temperature into the mold.

In witness whereof I have hereunto set my hand this 30th day of December, 1905.

EDMUND H. FARQUHAR.

Witnesses:
BENJAMIN B. HULL,
HELEN ORFORD.